US006770882B2

(12) United States Patent
Carr et al.

(10) Patent No.: US 6,770,882 B2
(45) Date of Patent: Aug. 3, 2004

(54) MICROMACHINED PYRO-OPTICAL STRUCTURE

(75) Inventors: William Carr, Montclair, NJ (US); Dadi Setiadi, Montclair, NJ (US)

(73) Assignee: Multispectral Imaging, Inc., Newark, NJ (US)

( * ) Notice: Subject to any disclaimer, the term of this patent is extended or adjusted under 35 U.S.C. 154(b) by 0 days.

(21) Appl. No.: 10/044,436

(22) Filed: Jan. 14, 2002

(65) Prior Publication Data

US 2003/0132386 A1 Jul. 17, 2003

(51) Int. Cl.[7] .................................................. G01J 5/62
(52) U.S. Cl. ..................... 250/338.1; 250/332; 250/351
(58) Field of Search ............................ 250/338.1, 332; 250/351; 356/519

(56) References Cited

U.S. PATENT DOCUMENTS

| | | | |
|---|---|---|---|
| 4,262,198 A | | 4/1981 | Gupta |
| 4,594,507 A | | 6/1986 | Elliott |
| 4,751,387 A | | 6/1988 | Robillard |
| 4,994,672 A | | 2/1991 | Cross |
| 5,100,218 A | | 3/1992 | Tuck |
| 5,286,976 A | * | 2/1994 | Cole .......................... 250/338.1 |
| 5,486,698 A | | 1/1996 | Hanson |
| 5,512,748 A | | 4/1996 | Hanson |
| 5,519,529 A | * | 5/1996 | Ahearn et al. ............... 250/332 |
| 5,589,689 A | * | 12/1996 | Koskinen .................. 250/338.1 |
| 5,629,521 A | * | 5/1997 | Lee et al. .................. 250/338.1 |
| 5,781,331 A | | 7/1998 | Carr |
| 5,796,152 A | * | 8/1998 | Carr et al. .................. 257/415 |
| 5,929,440 A | * | 7/1999 | Fisher ....................... 250/338.1 |
| 5,949,071 A | | 9/1999 | Ruffner |
| 6,087,661 A | | 7/2000 | Owen |
| 6,091,050 A | | 7/2000 | Carr |
| 6,097,031 A | * | 8/2000 | Cole ......................... 250/338.4 |
| 6,118,124 A | * | 9/2000 | Thundat et al. ............. 250/332 |
| 6,124,593 A | * | 9/2000 | Bly et al. .................... 250/332 |
| 6,194,721 B1 | * | 2/2001 | Bly ............................. 250/332 |
| 6,236,046 B1 | * | 5/2001 | Watabe et al. ............ 250/338.1 |

* cited by examiner

*Primary Examiner*—N. Le
*Assistant Examiner*—Stanley J. Pruchnic, Jr.
(74) *Attorney, Agent, or Firm*—DeMont & Breyer, LLC

(57) ABSTRACT

This invention is a micromachined sensor pixel structure that can be fabricated either as a discrete sensor or in array form with application to thermal sensing of radiation receive from various wavelength emitters. The transmissivity of a thermally-isolated microplatform is a sensitive function of temperature. This transmissivity is modulated by incident radiation from sources including infrared sources. The transmissivity of a micromachined structure is interrogated by means of an optical carrier. Readout is obtained by means of conventional silicon optical sensors or imagers. A multiplicity of micromachined pixels can be tailored for specific wavelengths permitting the array to operate as a multispectral imager with windows ranging from ultraviolet to millimeter wavelengths.

18 Claims, 6 Drawing Sheets

MICROMACHINED PYRO-OPTICAL STRUCTURE

CROSS REFERENCE TO RELATED APPLICATIONS

This application was originally filed as Ser. No. 60/249,721 dated Nov. 20, 2000 with the US Patent and Trademark Office.

TECHNICAL FIELD OF THE INVENTION

This invention relates generally to thermal sensing of low-level radiation of infrared or millimeter wavelengths and more particularly to a pyro-optical pixel structure and focal plane array with means for maintaining a nominal temperature. This invention describes a method of sensing incident radiation using a highly sensitive thermal thin film structure. In its embodiment as an array, a thermal image obtained typically from infrared wavelengths is interrogated using an optical carrier beam and readout with conventional CCD or CMOS silicon imagers.

STATEMENT REGARDING FEDERALLY SPONSORED R&D

Work leading to this invention was not funded by the US Government.

BACKGROUND OF THE INVENTION

Thermal-based sensor systems typically use a pixel that is highly sensitive to temperature differentials. This minute temperature differential is read out using conversion techniques into an electrical signal. The basic components for a thermal imaging system generally include optics for collecting and focusing the incident irradiation from a scene onto an imaging focal plane. A chopper is often included in a thermal imaging system to produce a constant background radiance which provides a reference signal. The electronic processing portion of the thermal imaging system will subtract the reference signal from the total radiance signal to produce an output signal with a minimum background noise level.

The concept of using a pyro-optical material as a sensor to detect radiation by modulating a carrier beam was first disclosed by Elliott in U.S. Pat. No. 4,594,507. This concept is cited as prior art in FIG. 1 as an architectural representation of a system with an optical carrier source 1 and an external radiation source 2 illuminating a pyro-optical pixel 3 with a photodetector 4 to monitor the amplitude of the carrier source 2 modulated by the transmissivity of the pyro-optical pixel 3. In this example the low level radiation source is focused onto the pyro-optical plane 3 through refractory lens 5. The present invention is an improved sensor pixel based on the concept of FIG. 1. The present invention describes a micromachined pixel containing a pyro-optical film integral to a thermally isolated platform and positioned above a temperature-referenced substrate.

The thermal imager of Elliott (U.S. Pat. No. 4,594,507) includes a preferred embodiment of an optically active nematic crystal with a polarizer analyzer that is illuminated from an external light source of unspecified type. This thermal imager operates with an external photodetector of unspecified type illuminated by the external light source through the nematic, temperature-sensitive crystal. The result is an image converter operating with the nematic crystal as the modulator. The system detailed by Elliott operates within an oven typically at 28 deg C. and is specified for imaging infrared irradiation only. Individual pixel structures are not disclosed or claimed and thus items such as separate pixel heaters and micromachined structures are not embodied in this invention. The Elliott system does not use compactness of construction since the external light source and photodetector are not integrated into the structure containing the nematic liquid crystal. Thermal isolation structures surrounding the nematic crystal film and any specific type of optical light source are not mentioned. Performance-enhancing interferometric structures are not mentioned.

Hanson in U.S. Pat. No. 5,512,748 discloses a thermal imaging system containing a focal plane array in which a visible or near-infrared source is used to transfer an image from a transmissivity-modulated pyro-optical film layer onto an associated integrated circuit photodetector. The photodetector integrated into the substrate generates a bias signal representing the total radiance imaged from a remote low-level scene. A thermal sensor is described which contains infrared-sensitive material supported by two bifurcated support arms and nonflexing posts to maintain this film layer above the substrate with a gap therebetween. The thickness of the infrared-sensitive material is not mentioned except to note that it is preferably "very thin to enhance it's response to incident infrared radiation and to allow transmission of electromagnetic energy therethrough" (col. 7, line 8) without mention of Fabry Perot characteristics. The gap under the sensitive film is said to preferably correspond to ¼ wavelength of the selected infrared incident radiation wavelength to provide maximum reflection of the infrared from the semiconductor substrate to the infrared-sensitive film. Hanson does not disclose or claim the use of electrical heater elements or any means of temperature control within or without the infrared sensitive pixel. Hanson does not disclose or claim the use of vacuum surrounding the infrared-sensitive pixel.

Owen in U.S. Pat. No. 6,087,661 describes a structure with electrically conducting tetherbeams forming a signal flow path for readout from a pyroelectric pixel material. The tetherbeams further provide a thermal isolation for the pyroelectric sensor microplatform.

Ruffner et al in U.S. Pat. No. 4,751,387 describes the use of a silica foam called aerogel as a solid, thermal isolation film formed between the pyroelectric capacitor and an underlying substrate as part of a specific infrared-sensitive pixel design without claims describing components external to the pixel. The use of pyro-optical sensitive materials is not disclosed or claimed. The Ruffner patent does not mention heating elements or ovens, vacuum conditions, the use of any optical carrier interrogation beams, pyro-optical materials, or the use of performance-enhancing interferometric structures.

Robillard in U.S. Pat. No. 4,751,387 describes an infrared imaging system comprising a pyro-optic film consisting of dichroic liquid crystal coated on a membrane with a means of polarized visible light illumination onto the crystal film. In addition a means for analyzing the polarization of the visible light carrier after reflection from or transmission through the crystal film is included in a system where the readout described is the human eye. Robillard does not disclose or claim any micromachined structures, thermal isolation structures, the use of partial vacuum, ovens, or pixel heaters.

Cross in U.S. Pat. No. 4,994,672 describes an infrared imaging system including a sandwich structure of polarizing pyro-optic material formed over an optically transparent, thermally insulating foam such as silica aerogel. The reflectance (not transmission) of an interrogating light beam is modulated by the temperature of the material and is used to illuminate a pixel image onto a CCD. A container means is provided for enclosing the pyro-optical material and maintaining a stable temperature. The Cross system requires the use of polarized light. The present invention does not utilize the polarization of light. Cross does not modulate the transmission of the interrogating optical beam. Cross does not disclose the use of micromachined pixel structures, performance enhancing interferometric structures, vacuum conditions surrounding the pyro-optic material.

Tuck in U.S. Pat. No. 5,100,218 describes a specific thermal imaging system based on the thermal rotation of polarized light as it is modulated with transmission through a thermally-sensitive liquid crystal. The pyro-optical liquid crystal is separated from the optical source and photodetector by multiple lenses and thus is not a composite, sandwich structure integrating the optical carrier source and photodetectors. Liquid crystal is the only pyro-optical material mentioned. Pyro-optical materials that do not require polarization are not disclosed. Tuck does not disclose any micromachined structures, interferometric structures, any means of controlling ambient temperature, or operation with partial vacuum conditions.

Carr in U.S. Pat. No. 6,091,050 describes a micromachined platform that elevates automatically and without continuing power requirement which is useful for implementing pixels in the present invention. The platform is elevated to a desired level as a result of design and manufacturing controls to create the desired gap between the pyro-optical film and the underlying substrate thereby providing a Fabry Perot interferometric means of enhancing the absorption of incident low-level radiation. Prior state of the art low-level radiation sensors are generally operated using a means of synchronously chopping the incoming low-level radiation to provide an image signal and a reference signal. Electronics for receiving the biased signal and the reference signal and for subtracting the reference signal from the biased signal to obtain an unbiased signal representing radiance differences emitted by objects in the scene is typically implemented in these systems. Carr and Sun in U.S. Pat. No. 5,781,331 describe a micromachined shutter array that can serve as a means of synchronously chopping the incoming low-level radiation with the present invention.

Hanson et al in U.S. Pat. No. 5,486,698 describe an actuation means for periodic thermal coupling of a bolometer or ferroelectric sensing platform to a thermal reference substrate. This actuator operates by electrostatic force which is derived from an external voltage source and eliminates the need for an external mechanical chopper. Hanson does not disclose the use of microactuation as in the present case of a platform with a pyro-optical film.

SUMMARY OF THE INVENTION

It is one object of the present invention to provide an improved uncooled, micromachined sensor pixel structure which utilizes a monolithic and self-aligned pixel which responds to thermal radiation. The visible or near infrared transmissivity or reflectivity of the thermally-isolated platform within the pixel is a parameter sensitive to temperature and therefore provides the means of detecting incident, absorbed radiation. The parameters of the pyro-optical film contained within the platform that are temperature sensitive are the optical index of refraction, bandgap absorption, and free carrier absorption. In the schematic system of FIG. 1, the incident low-level radiation 2 typically of wavelength greater than 2 micrometers, when absorbed into the subject pixel, typically heats with a power ranging from femtoWatts to nanoWatts. The high intensity optical beam from source 1 is modulated by the pyro-optical transmissive structure 3 and detected in the readout 4. The resulting thermal modulation index obtained in the readout signal from 4 ranges up to 10 percent. The readout 4 is a photodetector and control circuits for gating and time multiplexing the output signal. For imaging applications, the output electrical signal is a video signal that is processed within 4 to include such functions as synchronous detection. When the optical source 1 is pulsed periodically and then detected synchronously by 4, noise from stray optical sources is eliminated thereby reducing the overall system noise level.

One embodiment of the invention includes a resistive heater element within the thermally-isolated platform integral with the pixel used to maintain a nominal temperature which is modulated by absorbed, incident radiation. The use of a resistive heater element integral with the platform also permits high speed thermal dithering to reduce the effects of thermal response hysteresis.

An advantage of the present pixel is that no polarizing or extinction analyzers are utilized as optical components. An interrogating visible or near infrared light beam is modulated by the platform and signal readout is obtained using an underlying photodetector.

A further uniqueness of the invention is that the resulting thermal modulation index of the signal readout for a given absorbed, incident radiation power is maximized by the use of a first and a second Fabry-Perot film and sandwich structure integral to the pixel illustrated in the FIG. 2 embodiment. Both Fabry Perot structures enhance the response to low-level radiation. The pyro-optical film 31 is itself a first Fabry-Perot structure with an optical thickness to maximize the index of modulation. The thickness optimum for film 31 is less than a wavelength of the carrier beam 21 and is a function of the pyro-optical film dielectric constant and the free carrier absorption at the wavelength of the low-level radiation. The pyro-optical film is typically of high index of refraction and is the primary modulator of optical carrier beam transmissivity. A second Fabry Perot structure is formed by the gap between the micromachined planar platform 31 and the substrate mirror 25 to further increase the index of thermal modulation. The second Fabry Perot structure by creates a node of maximum amplitude for the incident low-level radiation 22 within the platform structure and thus enhances absorption of said low level radiation.

The embodiments of the present invention include an optical focal plane array having thermal sensors formed by a multiplicity of the pixels and with a high degree of reticulation between adjacent pixel platforms to minimize thermal spreading between adjacent pixel elements and to improve the spatial modulation transfer function of the resulting thermal sensors. Tetherbeams are used to support the platform structures above the substrate and with shared support posts to reduce the total array area and to increase the fill factor of pixel utilization. The pixel array processes a low-level image in parallel without the need for line and row scanning circuits within the pixel structures. The image formatting is accomplished by an underlying photodetector array which is typically a CCD or optical CMOS imager.

BRIEF DESCRIPTION OF THE DRAWINGS

For a more complete understanding of the present invention, and the advantages thereof, reference is now made to the following descriptions taken with the accompanying drawings in which.

DESCRIPTION OF PREFERRED EMBODIMENTS

Figure 1:
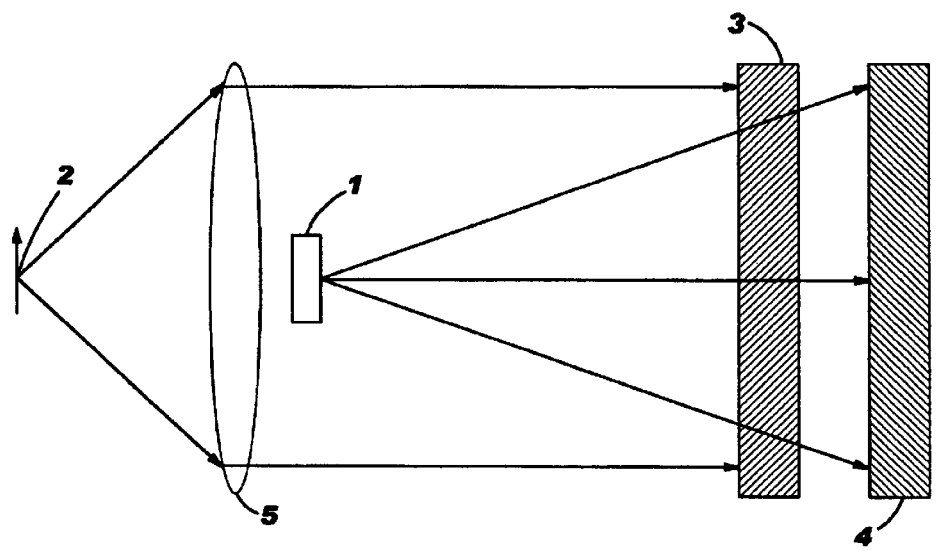
FIG. 1 is a block diagram representing the architectural functions of a pyro-optical sensor system based on modulation of the transmissivity of a carrier beam through a pyro-optical-film (prior art)
Figure 2:
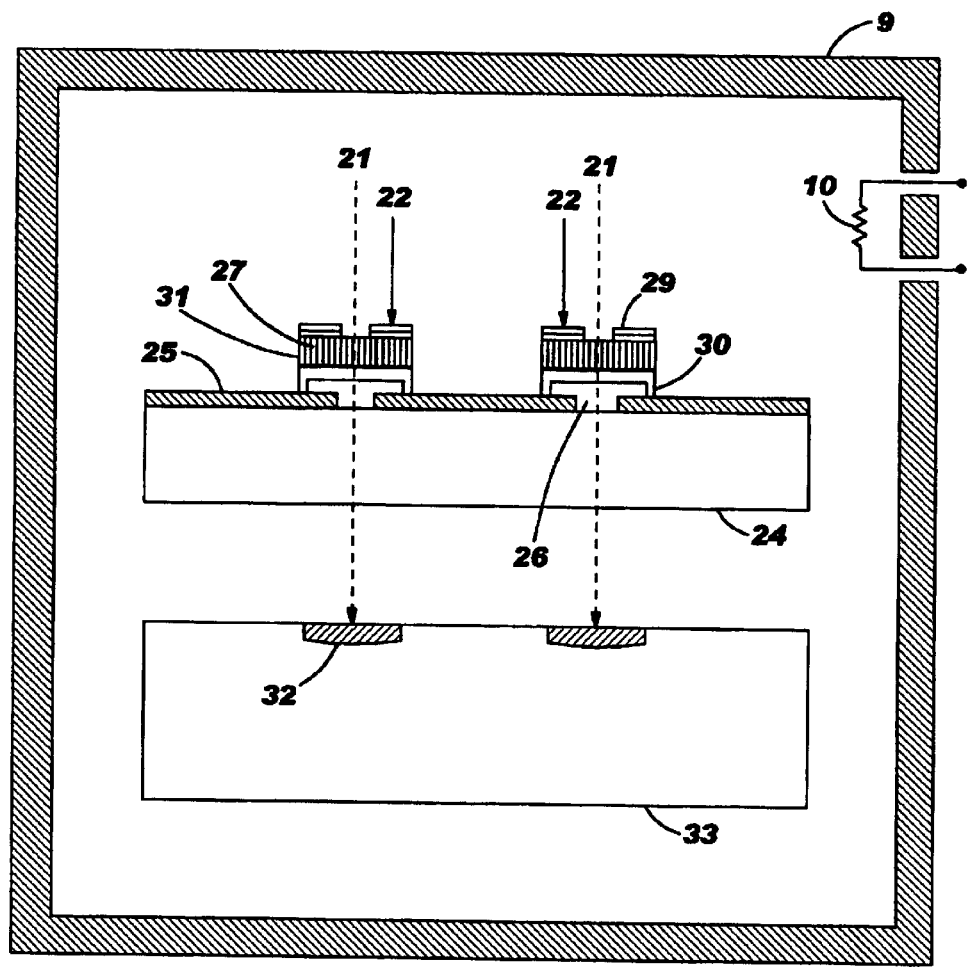
FIG. 2 is a cross-section schematic view of embodiment 1 a pyro-optical pixel with Fabry-Perot structures optimized for sensor performance within a specific infrared wavelength band

In the FIG. 2 first embodiment, a collimated or approximately collimated optical beam from an external LED beam 21 illuminates pyro-optical film 27 to form the first Fabry Perot structure. The two surfaces of dielectric film 27 comprise a Fabry Perot sandwich. A second Fabry Perot structure is comprised with the horizontal platform of structure 30 on the topside and metal reflector 25 on the lower side with a gap 26 separating the topside and lowerside planar surfaces. Two identical pixel structures 31 constitute the array of FIG. 2. An infrared beam 22 from an external low-level source is focused onto the plane of the platform for processing by a second Fabry-Perot structure 23. FIG. 2 is a schematic cross-section view of a pyro-optical pixel with first and second Fabry-Perot structures optimized for sensor performance at specific wavelength bands for the optical carrier beam modulation and absorption of the low-level radiation, respectively. The pixel structures are typically mounted in a vacuum cavity 9. The temperature ambient within the enclosure cavity 9 can be controlled by means of a resistive heater element 10 which also can be time-multiplexed for use as a thermister to measure oven temperature. This cross-section shows two representative pixels positioned over a photodetector array 33. The photodetector is integrated with the image converter structure 24 when components 24 and 33 are fabricated using a single starting silicon wafer including 33. An optically transparent material 24 is either in the form of a starting wafer such as quartz or a film such as silicon nitride and silicon dioxide or in the case where 24 is a film the structural substrate becomes 33 and the film 24 is integral with 33 without any gap there between. Silicon nitride and silicon dioxide films can be deposited directly on the underlying photodetector and are often used to passivate the photodetector surface in processing technology well known to silicon photosensor art. Next, a first metal fully reflecting film 25 of aluminum or gold is sputtered and lithographically patterned on the substrate to form the cross-section shown in FIG. 2. The first metal film contains a via path for the externally-sourced light emitting diode beam 21 to transit through to the underlying pixel 32 in the photodetector. The first metal film 25 is a reflector for both the optical carrier beam and the low level radiation. Next a sacrificial film is deposited and patterned in gap space 26 over the first metal 25 and support structure 24 to form an underlying surface for the deposition of platform structural support 30 anchors and tetherbeams. The sacrificial film in gap 26 is a high temperature polyimide or another polymer that is patterned to provide vias for the anchors for the platform structural support. Next the structure 30 of LPCVD silicon dioxide are deposited at a maximum temperature of 350 deg C. and patterned to define the platform, tetherbeams, and anchors. Structure 30 can alternatively be deposited and patterned in the form of a bimorph or multimorph with two or more layers of differing thermal coefficient of expansion. Multiple depositions of tetherbeam 30 films are deposited and patterned to achieve the desired elevation and thermal conductivity as described in U.S. Pat. No. 6,091,050. A film of pyro-optical material 31, preferably vanadium oxide, is deposited over the platform using sputtering and annealing. The thickness of the pyro-optical material is optimized to provide for a maximum modulation index of the transmission of the LED beam though the first Fabry Perot structure. The pyro-optic film 31 is of high index of refraction and provides for a quarter wavelength optical thickness for 800 nanometer photons when the vanadium oxide is approximately 85 nanometers in physical thickness. The thickness of the pyro-optical film 31 is the primary determiner of the first Fabry-Perot structure modulation function. An infrared absorbing film 29 for the purpose of absorbing the incident low-level radiation is deposited and patterned using lift-off lithography. This film 29 can be obtained using polymers containing suspensions of carbon or metal nanoparticles. The pyro-optical film 27 and the absorbing film 29 are elevated with the platform 31 and together, over the the underlying first metal, a physical gap 26 is thereby formed defining the second Fabry Perot structure. The gap 26 in the second Fabry Perot structure is a quarter wavelength of the low level infrared radiation which provides a maximum amplitude of the infrared radiation in the plane of the pyro-optical film 27. For example, in order to maximize the sensitivity of the pixel to infrared radiation of 10 microns wavelength, the gap 26 in the second Fabry Perot structure is 2.5 micrometers. An open via area within the first metal 25 provides an optical path 21 through to the CCD or CMOS detector. A sacrificial etch is now performed which removes all polyimide to provide the gap 26. This etch is accomplished using an oxygen plasma. The platform is thereby released and is now mechanically coupled to the substrate only through the tetherbeams 30. The released structure is adequately thermally isolated from the substrate to provide the desired thermal time constants for the platform with respect to the substrate. The substrate 24 serves as a heat sink for the extremely small variations in platform temperature resulting from the differential absorption of the low level radiation into said platform.

Embodiment 1 can also be fabricated using alternate thin film materials which are process compatible. For instance, the sacrificial film can be polysilicon if other exposed silicon surfaces are passivated with silicon dioxide. In this case, the silicon sacrificial film can be effectively etched using xenon difluoride.

Figure 3:
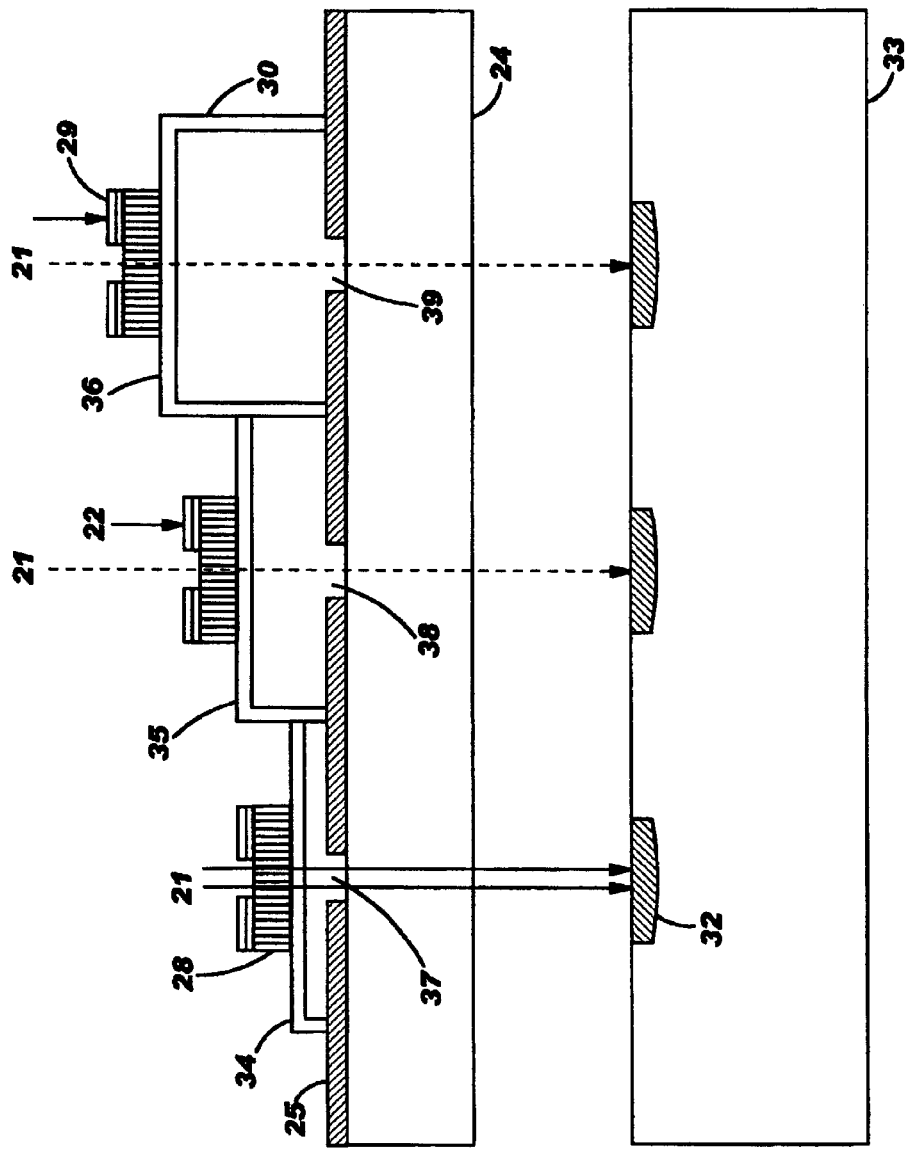
FIG. 3 is a cross-section schematic view of embodiment 2 three micromachined pixels with response optimized for three low level radiation wavelength bands: visible, 3–5 micrometers, and 8–12 micrometers

A second embodiment is shown in the cross-section view of FIG. 3. Here three different pixels 34, 35, 36 are shown, each tuned for a different infrared wavelength sensitivity. The pixels are tuned by means of the second Fabry Perot structure in which three different gaps 37, 38, and 39 are created using polyimide of three different thicknesses. The optical carrier beam 21 is modulated as it passes through the pyro-optical film. The second embodiment is fabricated similar to the first embodiment except that separate lithographic masking steps are used to define the thicknesses of the three polyimide sacrificial films. At the end of processing polyimide films for gaps 37, 38, and 39 are sacrificed by etching away using oxygen plasma. The pixels 34, 35, and 36 are aligned vertically over the pixels 32 of the underlying photodetector array 33. The result is three different pixels 34, 35, and 36 that can be arrayed to thousands of pixels permitting imaging of an infrared source with three wavelength bands. The three wavelength bands are separated by using temporal filtering or through the use of spatial addressing techniques within the photodetector array.

In other embodiments CCD or CMOS photodetector with separate pixel sites for red, blue, and green (RBG) sensitivities can be used. If the optical carrier beam is white visible light, then all photodetector pixels will receive a carrier beam signal. For the case using the RBG photodetector array, the platform pixels for each of the three filtered infrared wavelength bands are vertically aligned respectively over RBG sites. In this manner the RBG photodetector array readout contains the three separate infrared frames. For example, if the three filtered infrared wavelength bands are 2, 3–5, and 8–12 micrometers, the readout frames for red, blue, and green can provide corresponding images of the three desired infrared bands. In this embodiment all infrared readout frames are obtained with the optical carrier beam turned on.

Figure 4:
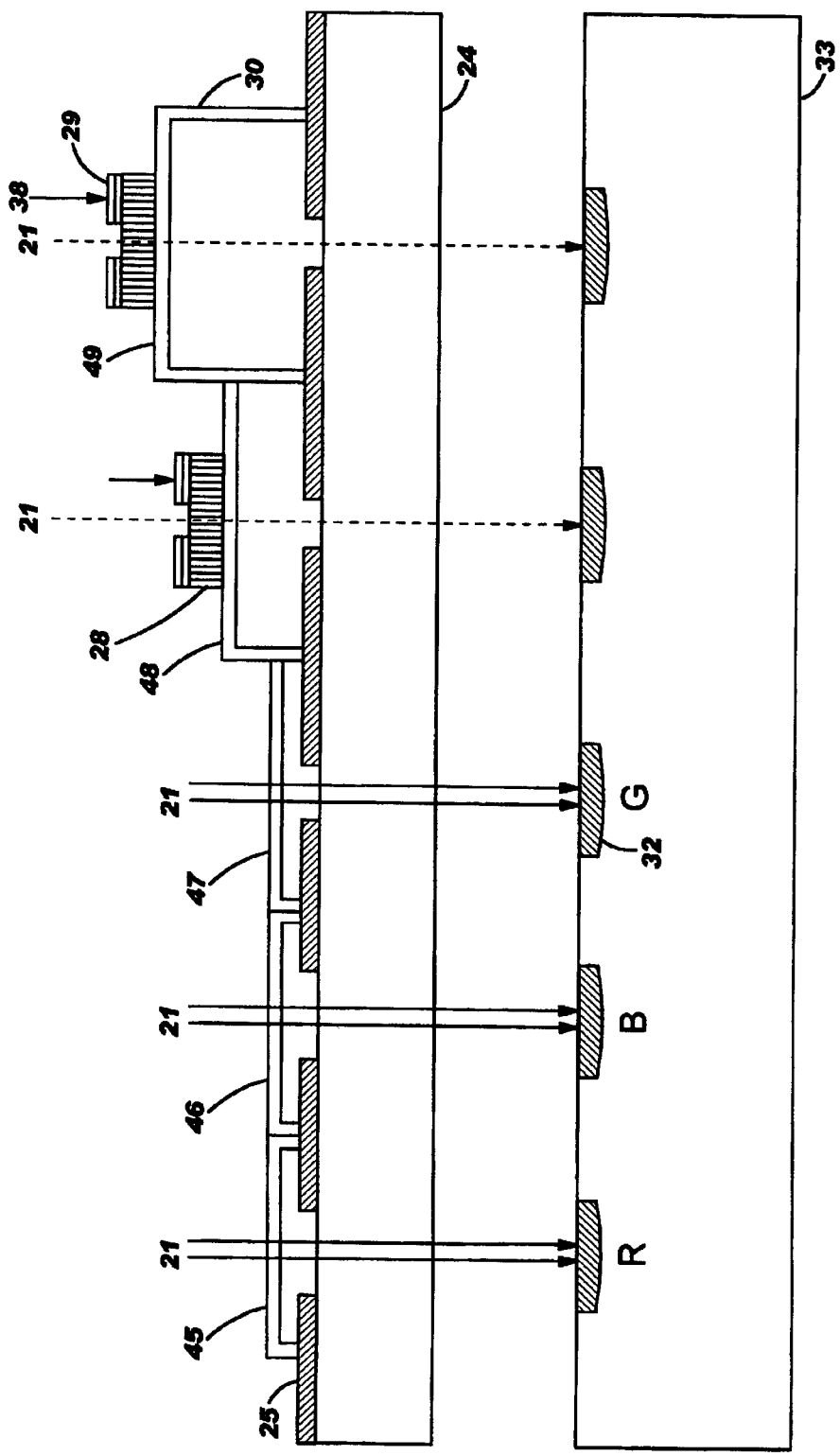
FIG. 4 is a cross-section schematic of embodiment 3 including 5 different micromachined pixels positioned over a CCD or CMOS imager arranged to provide sensitivity in separate arrays for red, blue, green (visible), 3–5 micrometers, and 8–12 micrometers low level radiation wavelengths FIG. 5 Top view of a embodiment 4 containing a 2×2 pyro-optical pixel array with integral thermal dithering heater elements and shared anchor pedestal. Tetherbeams are flexible and permit the pixel to move up and down.

FIG. 4 shows a third specific embodiment where certain pixels 45,46,47 are designed to exhibit maximum transparency to visible light 21 and other pixels 48,49 are designed with second Fabry-Perot structures for maximum sensitivity to the infrared. Embodiment 3 permits an imaging of low level ultraviolet, visible, or near infrared light with pixels 45, 46, 47 when the LED optical carrier source is disabled. In this case beam 21 becomes low-level radiation of ultraviolet, visible, or near infrared. If a color imager 33 is used, then a color image is obtained when the LED optical carrier source is disabled. When the LED optical carrier source is turned on, the pixels with the enhanced infrared sensitivity are read out. With standard monochrome or color photodetector arrays there is not provision for separating the needed 5 different images and thus the image separation must be performed using a time-multiplex filter at the output of the photodetector. When the LED carrier beam is extinguished during the exposure, readout of low level visible and ultraviolet wavelengths are directly incident on the CCD or CMOS detector readout.

Using the structures of FIG. 4 it is also possible to filter images of all five wavelength bands from a single frame of the CCD or CMOS imager readout by operating with the optical carrier beam enabled continuously. In this case the entire multispectrum of low level radiation is incident on each pixel platform. The RBG pixels of the silicon imager 33 underlying pixels 45, 46, 47 provide the three visible color images at the typical frame 30 frames/sec rate when the signal from the optical carrier beam is filtered out and a temporal filter is used. The infrared portion of the signal at photodetector pixels underlying infrared pixels 48 and 49 can be filtered out by time-multiplexing the signal from the readout imager 33. In this way all five wavelength bands are filtered from a single time frame of the color CCD or CMOS imager 33 readout.

Figure 5:
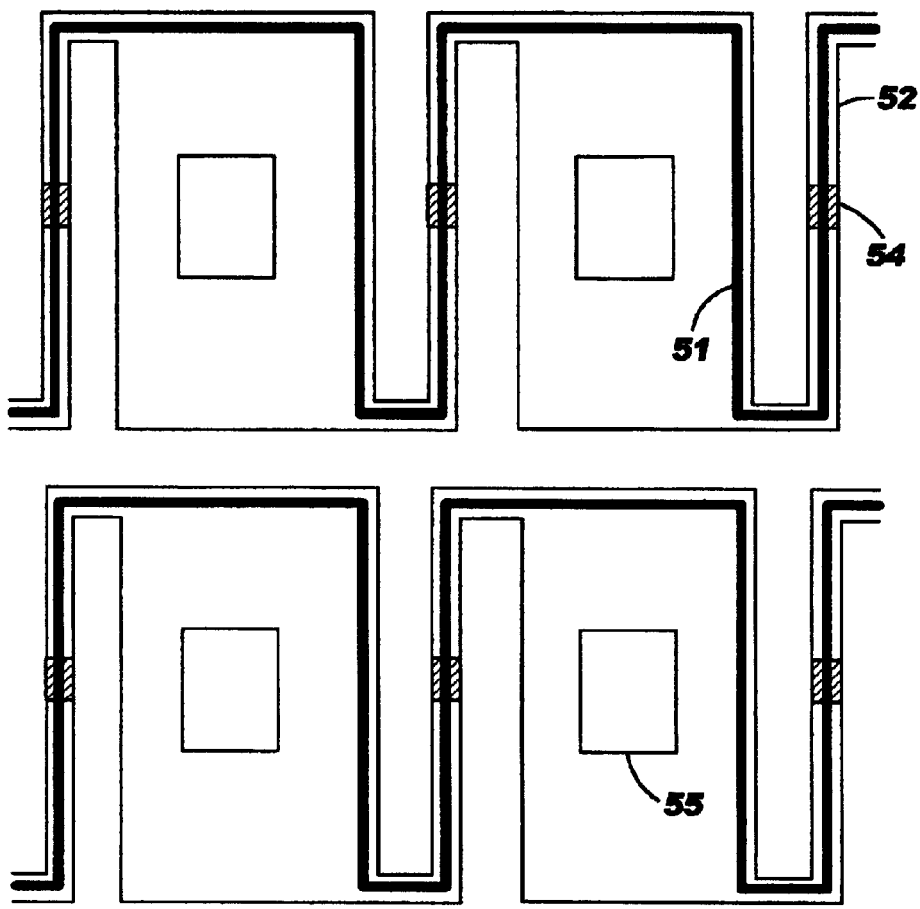

In embodiment 4 Illustrated in FIG. 5 heating elements 51 are fabricated integral to the pyro-optic structure and used to obtain a thermal actuation of the height of the platform. FIG. 5 is a top view of the basic structures of FIGS. 3 and 4 with heaters added. In FIG. 5 a series connection is shown for the heaters which provides a means for heating the entire array of heaters. Alternatively, any pixel heaters connected separately can be individually temperature controlled. This embodiment is Implemented as an add-on to embodiments 1, 2, and 3. The heating elements 51 are patterned onto the structural platform using a resistive film such as tantalum silicide, vanadium dioxide, or tungsten silicide by means of lift-off lithography. The electrical interconnections to the external heater power source are contained within the tetherbeams 52 and consist of conducting or partial conducting patterned films. Embodiment 4 contains all of the process steps of embodiments 1, 2, and 3 with additional processing to create the resistor heaters and interconnects. Tetherbeams are anchored by means of pedestal 54 to the substrate 24. The transparent opening 55 through the platform corresponds to the via in metal 25 of FIGS. 3 and 4 provides the path for the optical carrier beam 21 or low level optical radiation to the underlying CCD or CMOS imager. Embodiment 4 of FIG. 5 can be used for either or both of two purposes. In a first use, a relatively small temperature cycling of the platform causes the platform temperature to modulate over a limited range of less than 2 deg C. This provides an action termed dithering often used, to reduce hysteresis effects in sensor systems. In a second use, a large amplitude temperature cycling of over 10 deg C. causes the gap 26 to change and the platforms 28 periodically touch the underlying substrate 24. In this second use a reference signal is established corresponding to the case of no infrared thermal signal and synchronous detection can be used in a manner similar to that of a mechanical chopper often used with conventional infrared detection systems. Embodiment 4 utilizes thermal actuation.

Embodiment 5 utilizes electrostatic actuation to dynamically and incrementally position 31 of the second Fabry Perot structure vertically and control the gap 26 for selected pixels or the entire pixel array. The electrostatic actuation feature is obtained as in FIG. 6 using an external voltage potential 63 connected between electrode 62 with an electrical connection to the negative polarity of voltage source 63 and a substrate connection 61 to provide an electric field across gap 26. In this case the support pedestal 54 for the pixel tetherbeam is electrically isolated from the substrate 61. This actuation feature permits more precise tuning to maximize the response of infrared pixels by controlling the gap 26 in the second Fabry Perot structures 31, 34, 35, and 36 as a function of control voltage 63. The electrostatic actuation can be used to dynamically change the infrared window of maximum sensitivity for a pixel or array of pixels. The pixels of embodiments 1, 2, 3, and 4 are typically suspended using tetherbeams 63 that are horizontal with the plane of the substrate 61. There is a flexibility in these tetherbeams that permits them to move vertically with respect to the plane of the platform. The vertical gap is initially controlled through processing and the thickness of the sacrificial film as described in U.S. Pat. No. 6,091,050. In embodiment 5 illustrated in FIG. 6 the platform film 62 can itself form one electrode with respect to an opposing metal electrode 25 on the substrate to form an electrostatic actuator. When a voltage potential is applied between the two electrodes 62 and 25 the platform is attracted toward the substrate in opposition to the tetherbeams thereby controlling the gap 26 of the second Fabry Perot structure.

Figure 6:
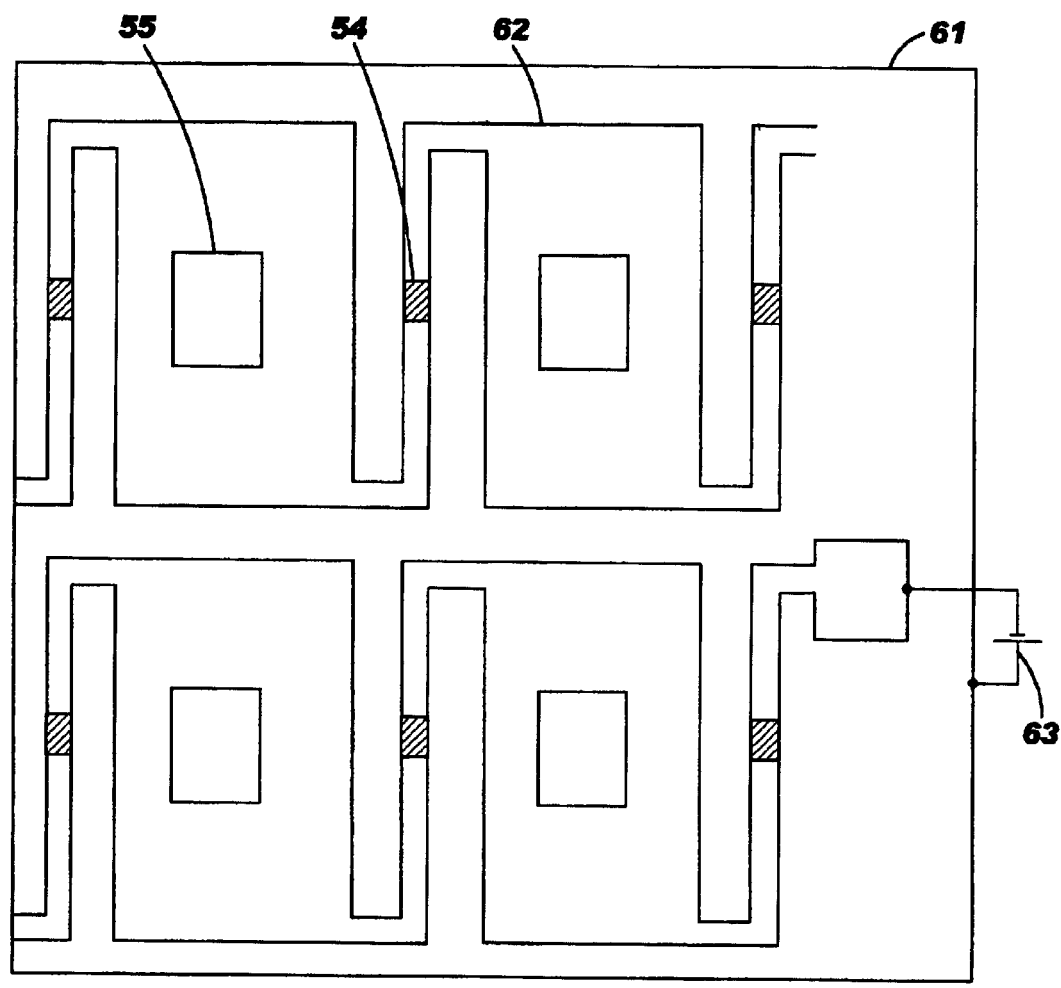
FIG. 6 Top view of embodiment 5 containing an illustrative 2×2 array of pixels overlying the metallic reflector in configuration for electrostatic actuation of the pixel. Pixel tether beams are flexible and permit the platform to move up and down.

When sufficient electrostatic potential 63 is applied, the platform 30 planar surface can be attracted to touch film 25, reducing the gap 31 to zero, and thereby eliminate the thermal isolation between the upper and lower Fabry Perot planes. When two gap positions (finite and zero) are obtained by periodically enabling the voltage source 63 a time window for maximum and minimum response to low-level radiation is achieved. These two response time windows provide successive biased and reference frames to the photodetector. The optical carrier signal can be synchronously processed by the readout 4 to provide an unbiased, minimum noise signal representing the desired low level radiation amplitude. This means of synchronous detection used here is commonly used in many different systems and is also sometimes referred to as a synchronous integrator. Embodiment 5 is fabricated into individual pixels as an addition to embodiments 1, 2, 3 or 4. FIG. 6 shows the first metal reflector 61 with electrical contacts and a further electrical contact to the platform 62 conducting or semiconducting film thus providing an electrical connection to the two actuator electrodes. An external voltage source 63 provides the potential for the desired electrostatic field within the second Fabry Perot structure. The platform does not operate about a rotational axis, but instead is a planer structure moving up and down as a parallel plate structure. The electrical connection to the platform electrode is obtained through an interconnect running along at least one tetherbeam of each pixel. Embodiment 5 can include embodiment 4 by patterning the first metal 25 into two interconnects for each pixel thereby providing an electrical path throughout the array for the voltage source 63. Additional external voltage sources can control the heater temperature using structures of embodiment 4 and the platform elevation structures of embodiment 5 simultaneously and independently using split patterns of interconnect.

Each embodiment describes a thermally-sensitive pixel that requires a partial thermal isolation of the platform structure 31 to obtain adequate thermal sensitivity. The pyro-optical structure is designed with thermal time constants in the range typically from 1 to 100 milliseconds to provide frame times in the range of 3 to 300 frames per sec. The pixel will generally be operated in a vacuum to obtain and control the desired thermal time constant for the pyro-optical structure. In typical vacuum operation the thermal time constant of the pixel is determined by the thermal mass of the pyro-optical structure and the thermal conductivity of the tetherbeams. When the pixel is operated under vacuum conditions to the thermal conductivity and convection effects of air ambient are eliminated. The pixels of this invention can be operated in air ambient but with reduced sensitivity to infrared radiation.

The pixel-structures of this invention are also sensitive to heating resulting from absorbed incident low-level millimeter wavelength radiation. The platform can contain structures that are tuned to specific millimeter wavelength bands to provide a detector for millimeter wavelength radiation. When an array of millimeter wavelength sensitive pixels is used, an imager for millimeter wavelength radiation is obtained.

While specific embodiments of the invention have been shown and described, obvious variations to these embodiments should be clear to one skilled in the art and still within the scope of the invention.

The invention claimed is:

1. An apparatus comprising;
    a pixel structure sensitive to incident low-level photonic radiation comprising;
    a planar substrate;
    a patterned metallic mirror disposed on the top surface of said planar substrate;
    a platform connected to said planar substrate by at least one tetherbeam, said tetherbeam having low thermal conductivity, wherein said platform and said planar substrate are separated by an air gap, said air gag forming a first Fabry-Perot cavity having a spacing that substantially maximizes the absorption of incident low-level radiation; and
    a pyro-optical film disposed on a surface of said platform, wherein said pyro-optical film has an optical transmissivity at the wavelength of an optical carrier beam that depends on the temperature of said pyro-optical film, and wherein said pyro-optical film defines a second Fabry-Perot cavity, wherein a thickness of said pyro-optical film substantially maximizes the thermal modulation index at the wavelength of said optical carrier beam.

2. The apparatus of claim 1 wherein said pixel structure further comprises an external photodetector, wherein said patterned metallic mirror contains an opening that is aligned with said external photodetector.

3. The apparatus of claim 2 wherein said pixel structure further comprises means for modulating the amplitude of said optical carrier beam with a periodic waveform such that response of said photodetector due to said carrier beam is gated in synchronization with the modulation of said carrier beam.

4. The apparatus of claim 1 wherein said pixel structure further comprises a resistive heater.

5. The apparatus of claim 4 wherein said pixel structure further comprises means for modulating the temperature of said platform in synchronization with a gating of an external detector.

6. The apparatus of claim 4 wherein said pixel structure further comprises means for causing said platform to contact said substrate such that said pixel structure is desensitized to low-level radiation.

7. The apparatus of claim 1 wherein said pixel structure is arranged as a planar array.

8. The apparatus of claim 7 wherein said tetherbeam further comprises a support post shared by a tetherbeam of an adjacent pixels.

9. The apparatus of claim 1 wherein said pixel structure further comprises:
    means for periodically chopping incident low-level radiation; and
    means for gating the amplitude of said optical carrier beam synchronously with said periodically chopped incident low-level radiation.

10. The apparatus of claim 9 wherein said pixel structure further comprises:
    an electrostatic actuator for changing the thickness of said air cap; and
    an external photodetector wherein said photodetector detects said optical carrier beam and is gated in synchronization with the movement of said electrostatic actuator.

11. The apparatus of claim 10 wherein said pixel structure further comprises means for tuning the infrared response over a selected spectral range by changing said air gap.

12. The apparatus of claim 1 wherein said pixel structure further comprises a heater element, wherein said heater element is external to said platform.

13. The apparatus of claim 1 wherein said platform includes means for monitoring and controlling the temperature of said platform.

14. The apparatus of claim 1 wherein said pyro-optical film is an oxide of vanadium operated in the temperature range 55 to 75 deg C.

15. The apparatus of claim 1 further comprising an optical source of said optical carrier beam, said optical source further comprising at least one member chosen from the set consisting of filtered incandescent optical sources, gallium arsenide pn junction photosources, GaAsP pn junction photosources, GaN pn junction photosources, GaAlN pn junction photosources, and InGaN pn junction photosources.

16. The apparatus of claim 1 wherein said tetherbeams comprises silicon dioxides.

17. The apparatus of claim 1 wherein said substrate further comprises a photodetector.

18. The apparatus of claim 1 further comprising a vacuum chamber enclosure, and wherein said pixel structure is contained within said vacuum chamber enclosure.

* * * * *